United States Patent [19]

Kowallik

[11] 4,071,942
[45] Feb. 7, 1978

[54] METHOD OF AND DEVICE FOR INTER-CONNECTING INDIVIDUAL PROFILED PLATES TO BE CONNECTED TO EACH OTHER END-TO-END, AND A STRUCTURAL CONNECTION EFFECTED THEREBY

[75] Inventor: Josef Kowallik, Freudenberg, Germany

[73] Assignee: Hoesch Werke Aktiengesellschaft, Dortmund, Germany

[21] Appl. No.: 668,933

[22] Filed: Mar. 22, 1976

[30] Foreign Application Priority Data
Mar. 22, 1975 Germany .............................. P2512759

[51] Int. Cl.² ........................................... B23P 19/00
[52] U.S. Cl. ................................. 29/469.5; 29/526 R; 83/272; 156/214; 156/256; 156/304; 156/309; 156/459; 156/518; 156/559; 228/173 C; 403/270; 403/282
[58] Field of Search .............. 228/173 C, 153; 83/272; 156/210, 71, 214, 304, 309, 459, 264, 251, 559, 562, 256, 522, 518; 29/417, 469.5, 526; 403/270, 279, 282, 284; 52/726, 618, 625, 630

[56] References Cited

U.S. PATENT DOCUMENTS

| 910,757 | 1/1909 | Wilson | 52/336 |
| 3,225,726 | 12/1965 | Tennison | 29/417 |
| 3,607,572 | 9/1971 | Jorgensen | 156/522 |
| 3,678,558 | 7/1972 | Fredericks | 29/160 |

FOREIGN PATENT DOCUMENTS

| 914,393 | 11/1972 | Canada | 29/469.5 |

*Primary Examiner*—Edward G. Whitby
*Attorney, Agent, or Firm*—Walter Becker

[57] ABSTRACT

A method of and device for interconnecting individual profiled plates to be connected to each other end-to-end, and a structural connection effected thereby, according to which the plates to be interconnected are aligned in end-to-end relationship and a sheet metal section withdrawn from a roll of sheet metal strip material, or a pre-profiled sheet metal part is placed across the ends to be interconnected of profiled plates whereupon a ram is moved relative to the sheet metal section or profiled sheet metal part to press the sheet metal section or sheet metal part into the profiled portion of the profiled plates and the sheet metal section now profiled or the pre-profiled sheet metal part is connected to the profiled plates.

4 Claims, 3 Drawing Figures

METHOD OF AND DEVICE FOR INTER-CONNECTING INDIVIDUAL PROFILED PLATES TO BE CONNECTED TO EACH OTHER END-TO-END, AND A STRUCTURAL CONNECTION EFFECTED THEREBY

The present invention relates to a method of and device for interconnecting individual plates to be coated with foam material to form a continuous cover layer, preferably for a continuous manufacture of compound elements while the ends of two plates at the abutting area are interconnected by strips which are provided with a fusion adhesive and are later made to stick by heat.

A device has become known for continuously applying foam material onto plate-shaped carrier material. To this end, a device has been employed for closing the abutting gaps of the carrier plates which are aligned one behind the other to form an endless band. This closing is effected by means of an adhesive strip or a band of synthetic material provided with a fusion adhesive, prior to applying the layer of synthetic material onto the continuously transported carrier plates, said adhesive strip or band of synthetic material being pressed on by means of a roller which may be heated. This heretofore known device can, however, be applied only for plane carrier plates because an application of the strips by means of rollers is with highly profiled carrier plates not possible in view of the different circumferential speeds required in view of the height of the profile. Such connection, furthermore, in view of the unstable strips will not assure any sufficient rigidity and strength. Moreover, in most instances, due to the foam not adhering within the region of the strip, it is necessary to cut a piece of the entire width of the strip off as waste.

It is an object of the present invention, even with highly profiled plates, to provide as rigid as possible and shape-retaining connection which will assure excellent power transmission possibilities and which, in case a separation is necessary at all at the abutment area, will require only one separating cut.

This object and other objects and advantages of the invention will appear more clearly from the following specification in connection with the accompanying drawings, in which.

Figure 3:
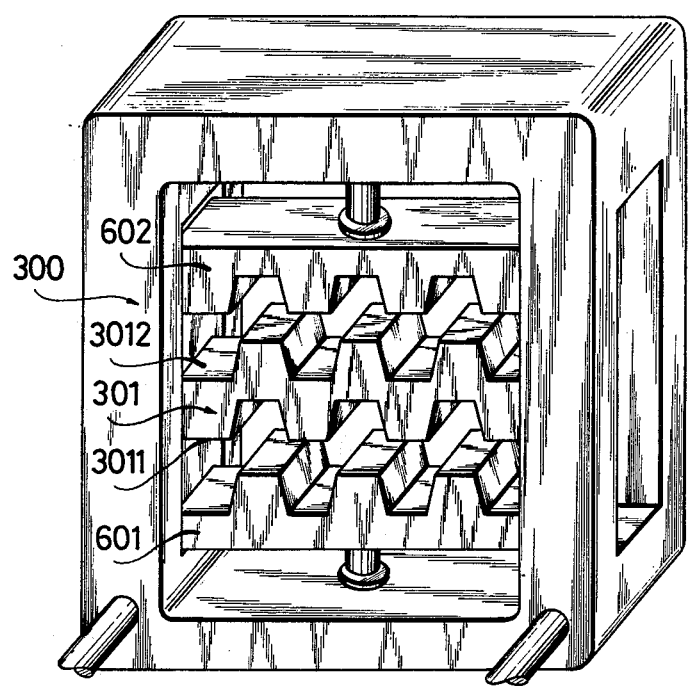

FIG. 3 primarily shows only the connecting device for the simultaneous connection of two upper and lower plates.

The method according to the present invention is characterized primarily in that with longitudinally profiled plates, preferably with plates having an undulated or trapezoidal profile, a metal strip is transformed in conformity with the desired profile and is over its entire surface perpendicularly to the plates pressed into the profiled matrix.

According to a further feature of the invention, it is possible to employ metal strips preformed in conformity with the desired profile of the plates.

It is also possible to transform the metal strips during the connecting operation while advantageously the metal strips may be cut off from a roll supplying the band.

The device according to the invention for practicing the above mentioned method is characterized by a connecting device adapted to be coupled to the plate which connecting device is equipped with a molding punch which is adapted to heat the metal strip and which is movable in a direction perpendicular to the plates.

According to a further feature of the invention, for activating the fuse adhesive, the molding punch may be heatable and may be designed for induction heating the metal strip.

According to a further feature of the invention, the connecting device may include a separating device which advantageously may consist of one molding punch and of a cutting blade on the connecting device.

Furthermore, the connecting device may also comprise a driving device and a rolling-off device for receiving a band roll when the metal strip is to be cut off from a band.

When relatively thin plates are involved, the connecting device may have associated therewith a profiled counter-holding device.

If simultaneously two upper and two lower plates are to be connected to one upper and one lower cover layer, two molding punches which are movable perpendicularly to the plates may be employed and a stationary counter-holding device may be arranged therein or a counter-holding device respectively movable perpendicularly to the plates may be associated with the stationary molding punch at the top and at the bottom.

Figure 1:
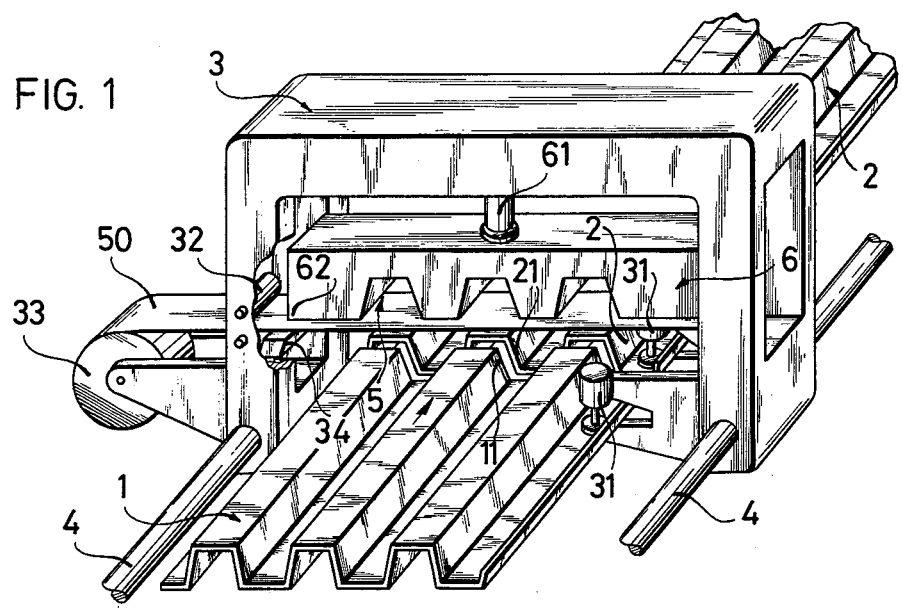
FIG. 1 illustrates a connection with a metallic strip to be cut off.
Figure 2:
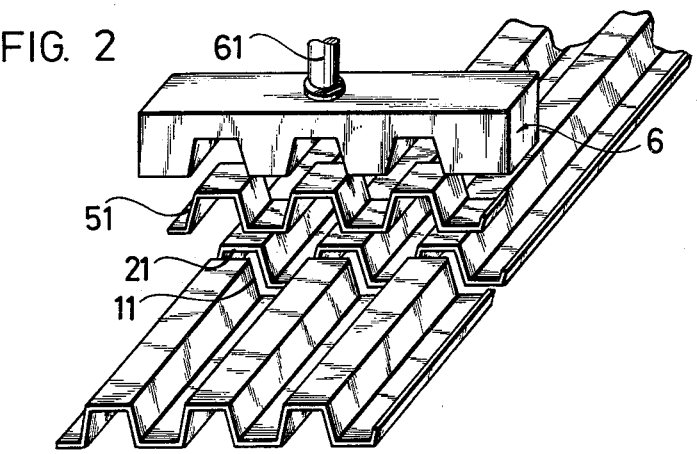
FIG. 2 illustrates partially the employment of preshaped metal strips.

Referring now to the drawing in detail, it is assumed that according to FIG. 1, a cover plate is to be prepared by interconnecting plates 1 and 2. To this end, on a roll table, in a manner not shown, plate 1 has its front end 11 moved directly against the rear end 21 of plate 2. In FIGS. 1 and 2, for the sake of more clearly illustrating the arrangement, a greater distance is illustrated between the plate ends 11 and 21. This distance can, according to the requirements also be selected of a different magnitude. When this position has been reached, a not illustrated control will actuate the connecting device 3 which through coupling devices 31 is connected, for instance hydraulically or mechanically to the plates 1 and 2 and together with the same is synchronously displaced while sliding on the guiding means 4. However, also a synchronous control may be utilized by means of which it is possible to drive the device 3 by motor (power). By means of the driving device 32, the metallic strip 5 which at its bottom side is provided with a first known sticking fusion adhesive is withdrawn from the band roll 50 arranged at the rolling-off device 33, and is advanced over the width of plates 1,2 up to the abutment at the connecting device 3. During the downward movement of the molding punch 6 which is moved by an adjusting cylinder 61, the metallic strip 5 is cut off between the blade 62 arranged on the molding punch 6 and also the blade 34 arranged on the connecting device 3, and over its entire surface is pressed into the profile of plates 1,2 and is cemented to the two plate ends 11, 21 by a fusion adhesive activated by the molding punch or ram means 6 which is heated for this purpose.

After expiration of the desired time for activating the fusion adhesive, the molding punch 6 is moved upwardly, the locking of the connecting device 3 with plates 1 and 2 by means of the coupling devices 31 is made ineffective and the connecting device is in non-illustrated manner returned to its starting position. FIG. 2, while omitting the connecting device, shows that for purposes of connecting the ends 11, 21 of plates 1,2 pre-formed metallic strips 51 may be employed. The pre-formed metallic strips 51 may either manually be placed into the profiles of plates 1,2 or may temporarily till the cementing to the plates 1,2 has been effected be held below the molding punch 6 by means of non-illustrating magnets, suction heads, or in any similar manner.

For the sake of clarity, FIG. 3 shows substantially only the connecting device. For purposes of a simultaneous interconnection of two upper plates on one hand and two lower plates on the other hand, there is provided at the bottom side 3011 of the counter holder 301 a cut-off metallic strip which has its bottom side provided with a fusion adhesive, whereas another cut-off metallic strip is arranged at the top side 3012 of the counter holder. This last mentioned metallic strip has its top side provided with a fusion adhesive.

After the ends of the upper plates have pushed each other apart, which upper plates rest on the metallic strip and the top side 3012 of the counter holder 301, and after also the lower plates have pushed each other away, which lower plates rest upon the lower molding punch 601, the two punches 601 and 602 are moved toward each other, and the two metallic strips are cemented to the ends of the upper and lower plates.

The cover layers which are formed by the upper and lower plates and comprise tight and firm abutting connections may at a vertical distance with regard to each other be conveyed to a foaming installation while between said cover layers a foam material is introduced first in a liquid condition and subsequently hardening.

As will be evident from the above, the present invention provides for a relatively rigid aging-resisting connection. The two end of the plates to be interconnected are pressed into a position in which they precisely cover each other. The said two ends are pressed into said position by the molding punch which over a relatively long period acts perpendicularly with regard to said plates.

As a result thereof, a proper abutment area is provided which furnishes favorable possibilities for power transmission and due to its good appearance, for instance with roof elements, or when for instance an abutment with a very long building element is unavoidable in view of too short a manufacturing length, can be employed without further post operation.

If, however, a division is necessary, also within the region of the metallic strip only one separating cut without waste is necessary in view of the good adherence of the foam.

Furthermore, in conformity with the present invention, it is assured that the metallic strip is over its entire surface connected to the plate cross section, and that also complicated, especially deep profiles can be safely produced.

Finally, also the metallic strip may, depending on the requirements, be arranged on one or the other side of the plates to be interconnected.

It is, of course, to be understood that the present invention is, by no means, limited to the specific showing in the drawing, but also comprises any modifications within the scope of the appended claims.

What I claim is:

1. A method of interconnecting individual longitudinally and identically transversely profiled plates, which includes in combination the steps of: longitudinally aligning end to end two longitudinally and identically transversely profiled plates to be interconnected so that their adjacent end faces at least nearly abut each other and their profiles are in longitudinal alignment with each other, applying a sheet metal piece profiled according to the profile of the plates to be interconnected to and across said plates over the area where said plates at least nearly abut each other, pressing said profiled sheet metal piece entirely and vertically into the corresponding profile of the plates to be interconnected transversely, and cementing said profiled sheet metal piece to said plates to be sealingly interconnected by fusion adhesive.

2. A method in combination according to claim 1, in which preforming said profiled sheet metal piece occurs prior to placing said profiled plates into position for interconnecting said plates end to end.

3. A method in combination according to claim 1, in which preparing said profiled sheet metal piece occurs from a sheet metal strip placed transverse to and over those areas of the profiled plate ends which at least nearly abut each other, and profiling said sheet metal strip by pressing it against the profiled plates to be interconnected.

4. A method in combination according to claim 3, in which withdrawing said sheet metal strip occurs from a reel containing same and cutting to length after having been placed across the plates to be interconnected.

* * * * *